(12) United States Patent
Bengtsson (10) Patent No.: US 9,794,733 B2
(45) Date of Patent: Oct. 17, 2017

(54) SYSTEM, METHOD AND DEVICE FOR TRANSFERRING INFORMATION VIA BODY COUPLED COMMUNICATION FROM A TOUCH SENSITIVE INTERFACE

(71) Applicant: Sony Mobile Communications Inc., Tokyo (JP)

(72) Inventor: Henrik Bengtsson, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 48 days.

(21) Appl. No.: 14/668,042

(22) Filed: Mar. 25, 2015

(65) Prior Publication Data
US 2016/0286338 A1  Sep. 29, 2016

(51) Int. Cl.
| | |
|---|---|
| H04B 7/00 | (2006.01) |
| H04W 4/00 | (2009.01) |
| G06F 3/041 | (2006.01) |
| G06F 3/14 | (2006.01) |
| H04B 13/00 | (2006.01) |
| G06F 3/0488 | (2013.01) |
| H04M 1/725 | (2006.01) |

(52) U.S. Cl.
CPC .......... *H04W 4/008* (2013.01); *G06F 3/0416* (2013.01); *G06F 3/0488* (2013.01); *G06F 3/1454* (2013.01); *H04B 13/005* (2013.01); G06F 2203/0384 (2013.01); H04M 1/7253 (2013.01)

(58) Field of Classification Search
CPC ...... H04B 13/005; H04B 5/0031; H04B 7/26; H04W 4/008; H04W 52/0209; G06F 21/34; G06F 21/35; G06F 3/0416; G06F 3/1454
See application file for complete search history.

(56) References Cited

U.S. PATENT DOCUMENTS

| | | |
|---|---|---|
| 6,580,356 B1 | 6/2003 | Alt et al. |
| 7,202,773 B1 | 4/2007 | Oba et al. |
| 2005/0008148 A1 | 1/2005 | Jacobson |
| 2005/0243061 A1 | 11/2005 | Liberty et al. |
| 2007/0145119 A1 | 6/2007 | Rhelimi |
| 2007/0282783 A1 | 12/2007 | Singh |
| 2009/0094681 A1 | 4/2009 | Sadler et al. |
| 2009/0124282 A1 | 5/2009 | Kim |
| 2010/0259491 A1 | 10/2010 | Rajamani |

(Continued)

FOREIGN PATENT DOCUMENTS

| | | |
|---|---|---|
| EP | 2018038 | 1/2009 |
| EP | 2378748 | 10/2011 |

(Continued)

OTHER PUBLICATIONS

International Search Report from counterpart International Application No. PCT/IB2015/057373, dated Dec. 14, 2015.

*Primary Examiner* — Ankur Jain
(74) *Attorney, Agent, or Firm* — Tucker Ellis, LLP (57) ABSTRACT

A method, system and device for transferring specific information data to a user thereof comprising at least a first and a second body coupled communication (BCC), enabled devices forming a body area network (BAN), wherein the first BCC enabled device comprises a touch sensitive interface and the second BCC enabled device is worn by the user.

12 Claims, 6 Drawing Sheets

(56) References Cited

U.S. PATENT DOCUMENTS

| | | |
|---|---|---|
| 2010/0277435 A1 | 11/2010 | Han et al. |
| 2011/0018731 A1 | 1/2011 | Linsky |
| 2011/0205156 A1 | 8/2011 | Gomez et al. |
| 2012/0026129 A1 | 2/2012 | Kawakami |
| 2012/0113051 A1* | 5/2012 | Bird ................. H04B 13/005 345/174 |
| 2012/0133605 A1 | 5/2012 | Tanaka |
| 2012/0220233 A1* | 8/2012 | Teague ................. G01S 5/0289 455/41.2 |
| 2012/0249409 A1 | 10/2012 | Toney et al. |
| 2012/0324368 A1 | 12/2012 | Putz et al. |
| 2013/0017789 A1 | 1/2013 | Chi et al. |
| 2013/0174049 A1 | 7/2013 | Townsend et al. |
| 2014/0085050 A1 | 3/2014 | Luna |

FOREIGN PATENT DOCUMENTS

| | | |
|---|---|---|
| EP | 2600319 | 6/2013 |
| JP | 2008073462 | 4/2008 |
| JP | 2009049951 | 3/2009 |
| WO | WO 2011/021531 | 2/2011 |

\* cited by examiner

SYSTEM, METHOD AND DEVICE FOR TRANSFERRING INFORMATION VIA BODY COUPLED COMMUNICATION FROM A TOUCH SENSITIVE INTERFACE

TECHNICAL FIELD

The present disclosure relates in general to the field of wireless communication devices, and particularly to communication devices, such as smart phones or tablets, configured for both wireless and Body Coupled Communication, BCC, with at least one further portable electronic communication device, such as a watch or a wristlet, worn by a user, creating a Body Area Network, BAN. The present invention relates to a system and a method for transferring information between devices equipped with, and utilizing Body coupled communication, BCC, technology.

BACKGROUND ART

There is an emerging consumer market for certain devices that are used as companion products to smartphone devices. Their popularity can be traced, in part, to the variety of features they provide to a user. For example, one such device is a wearable device, such as a ring worn on the user's finger, a necklace, glasses, or a "wristlet" (e.g., a watch or wristband) that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone, thereby permitting the user to bypass the manual entry of a predetermined unlock sequence associated with the smartphone.

Such features are already present on commercial products/devices. However, a common issue associated with these devices is that they either need a physical interface (e.g. a 3.5 mm audio plug, an Universal Serial Bus (USB), etc.) or some sort of wireless "local connectivity" (e.g., BLUETOOTH, Wi-Fi, Near Field Communication (NFC), etc.), in order to transmit data between the devices. Such methods for communicating, however, can be cumbersome. Additionally, these types of communication may be a limiting factor that could constrain new features waiting to be implemented on such devices.

Body-coupled communication (BCC) is a communication in which the human body serves as a transmission medium. For example, a communication signal may travel on, proximate to, or in the human body. According to one known approach, this may be accomplished by creating a surface charge on the human body that causes an electric currant and formation and re-orientation of electric dipoles of human tissues. A transmitter and a receiver are used to transmit a body-coupled signal and receive the body-coupled signal. There are a number of advantages related to body-coupled communication compared to other forms of communication, such as power usage, security, resource utilization, etc.

In different cities, malls, airport, railway stations etc. there are maps to help tourists, customer, travellers etc., be guided where they are and where to go. Currently there are various drawbacks to this guiding solution, For example, these maps are often not digital and just printed on paper and the information will be old fast. Another drawback is that the location of the map is often shown, as with the "you are here" and if the tourist wants to go somewhere, e.g. to Postiljonsgatan 9, the tourist has to find the position on the map, and then the tourist need to think how to get there.

Thus, there is a need for a simple, easier and more intuitive and secure ways of guiding persons in different environment by means of easy and convenient methods.

SUMMARY OF THE INVENTION

With the above description in mind, then, an aspect of the present disclosure is to provide a system, method and device which seek to mitigate, alleviate, or eliminate one or more of the above-identified deficiencies in the art and disadvantages singly or in any combination.

These and further aspects are achieved by a system, method and device equipped with, and utilizing Body coupled communication, BCC, technology. The disclosure provides for a system, methods and device for transferring information from a BCC enabled device equipped with a touch sensitive interface to another BCC enabled device.

The present disclosure is defined by the appended claims. Various advantageous embodiments of the disclosure are set forth by the appended claims as well as by the following description and the accompanying drawings.

According to some aspects, the disclosure provides for a method performed in a system for transferring specific information data to a user thereof comprising at least a first and a second body coupled communication, BCC, enabled devices forming a body area network, BAN, wherein the first BCC enabled device comprises a touch sensitive interface and the second BCC enabled device is worn by the user.

According to some aspects, the method comprises the steps of receiving, in the first BCC enabled device, at least one BCC signal from the second BCC enabled device via a body part of the user when the body part is touching the touch sensitive interface of the first BCC enabled device, detecting, in first BCC enabled device, a position of the body part on the touch sensitive interface based on the received at least one BCC signal, collecting specific information data related the detected position on the touch sensitive interface, transmitting, the collected information related to the detected position from the first BCC enabled device to the second BCC enabled device and receiving, the collected information from the first BCC enabled device in the second BCC enabled device, thereby enabling the second BCC enabled device to process the specific information data. By performing the above steps, a way of transferring information presented on a touch sensitive display to a wearable communication device of a person touching the display is provided. The method also provides that the user can bring the transferred information with him or her when leaving the display.

According to some aspects, the disclosure provides for a system for transferring specific information data to a user thereof comprising at least a first and a second body coupled communication, BCC, enabled devices for forming a body area network, BAN. The first BCC enabled device comprising a touch sensitive interface, communication circuitry and processing circuitry and wherein the processing circuitry is configured to receive, via the communication circuitry, at least one BCC signal via a body part of the user when the body part is touching the touch sensitive interface, detect a position of the body part touching the touch sensitive interface based on the received at least one BCC signal, collect specific information data related to the detected position on the touch sensitive interface and transmit via the communication circuitry, the specific information related to the detected position, to the second BCC device. The second BCC enabled device comprises communication circuitry and processing circuitry. The processing circuitry of the second BCC enabled device is configured to receive, via the communication circuitry, the collected specific information data from the first BCC enabled device, thereby enabling the second BCC enabled device to process the specific information data.

The features of the above-mentioned embodiments can be combined in any combinations.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The device and method disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Embodiments of the present disclosure will be exemplified using a wireless communication device such as a mobile phone. However, it should be appreciated that the disclosure is as such equally applicable to any communication devices which have Body Coupled Communication, BCC, communication capabilities. Examples of such devices may for instance be any type of mobile phone, smartphone, laptop (such as standard, ultra portables, netbooks, and micro laptops), handheld computers, portable digital assistants, tablet computers, touch pads, gaming devices, accessories to mobile phones, e.g. wearable communication devices in the form of headphones/-sets, visors/goggles, bracelets, wristbands, necklaces, watches, headbands, rings, etc.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Body Area Network, BAN, standards such as IEEE's 802.15.6 or Sony's CCCC is enabling the possibilities for commercialized BAN devices. The first BAN enabled devices have its background in the medical area, as BCC is a communication standard optimized for low power devices and operation on, in or around the human body. BCC makes it possible to communicate with 2 meters (m) or less between the devices over the body in the frequency band 13-40 MHz Body Coupled Communications, BCC, or also called Body-Based Communication, BBC or Near-Body Communication, NBC, has been proposed as a promising alternative to radio frequency, RF, communication as a basis for Body/Personal Area Network, BAN/PAN, communication. BCC allows for an exchange of information between a plurality of devices which are in contact with or in close proximity of a living body. This can be achieved by the transmitting BCC-/BAN-antenna that provide a capacitive or galvanic coupling of low-energy electrical fields onto the body surface, i.e. leakage currents with a small magnitude is set to spread out over the human body. The small currents are then detected by a receiver BCC antenna, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-antennas is very low.

Figure 1:
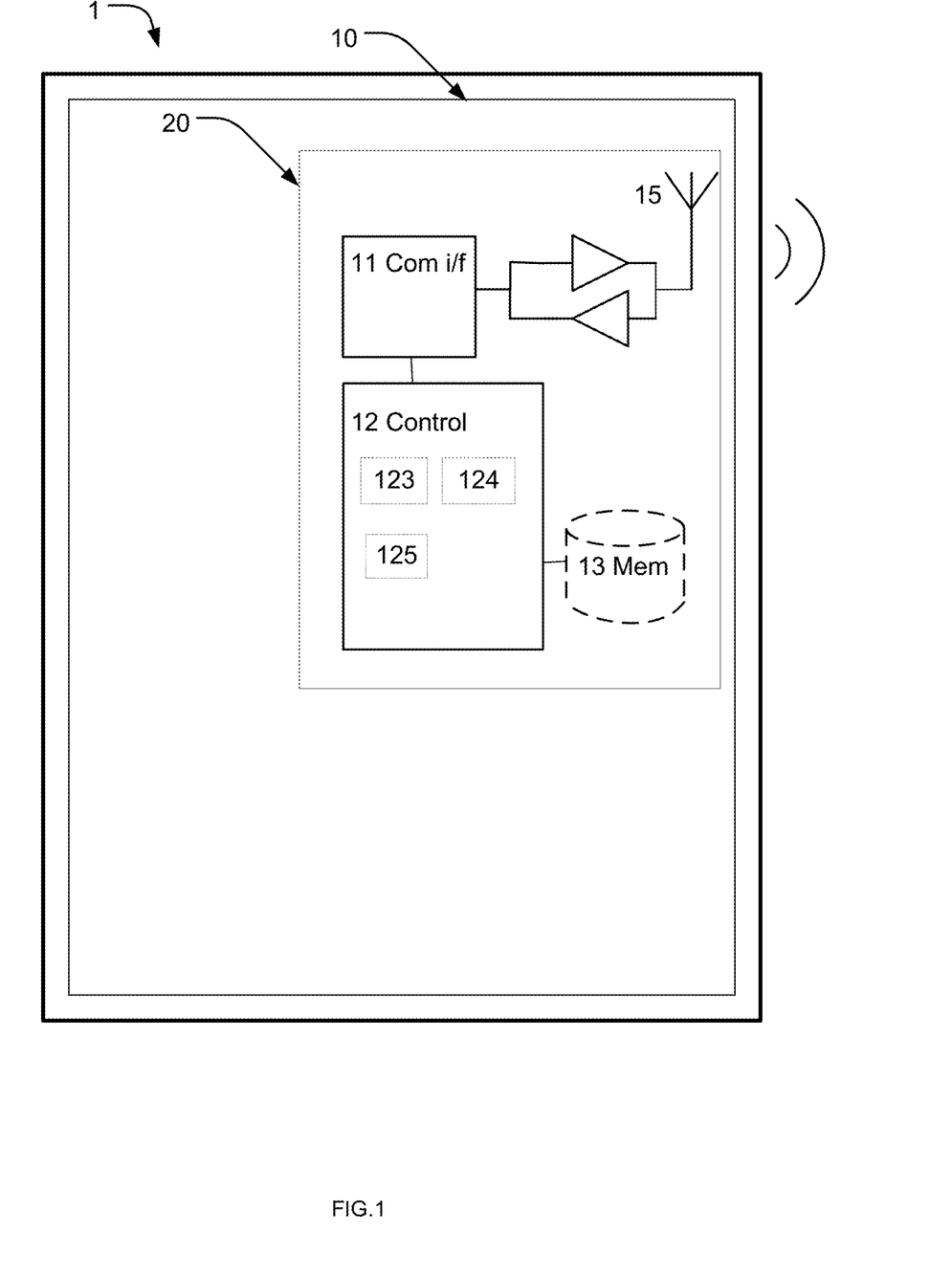
FIG. 1 illustrates an example of a communication device with a touch sensitive interface.
Figure 8:
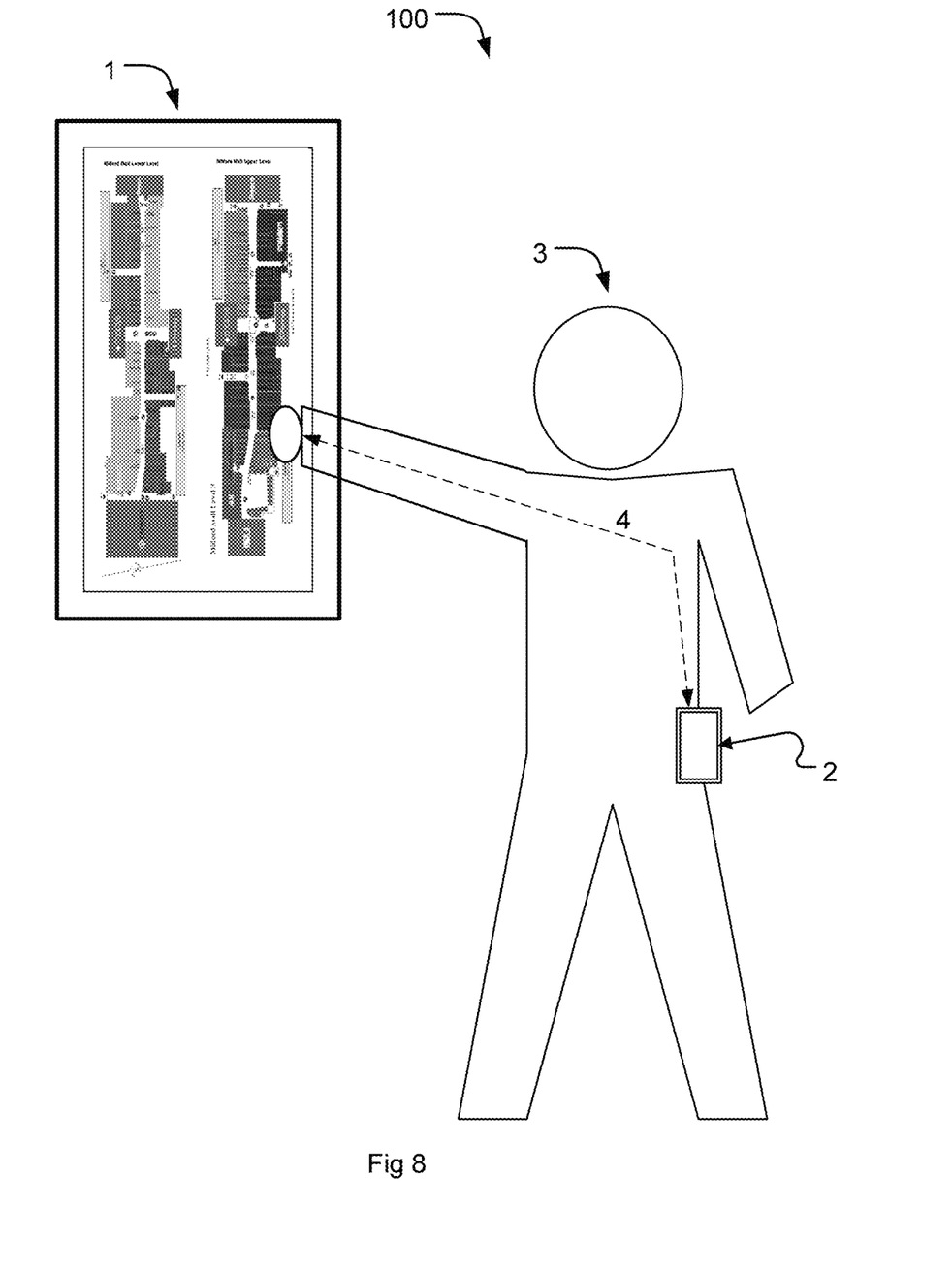
FIG. 8 illustrates a system comprising a communication device with a touch sensitive interface and a user wearing a communication device.

Referring in detail to the drawings, and initially to FIG. 1, a communication device according to some aspects of the disclosure is illustrated generally at 1. The figure illustrates a Body Coupled Communication, BCC, enabled communication device 1, comprising communication circuitry 11 and processing circuit 12. The communication device further comprises a memory 13 for storing data. The memory may be any type of memory suitable for a communication device. The BCC enabled communication device 1 further comprises a touch sensitive interface that provides for transmission and reception of body-coupled communication, BCC, signals 4. The BCC enabled communication device with a touch sensitive interface in this application refers to any BCC enabled touch sensitive communication device to be touched by a user. Examples of such BAN enabled touch sensitive communication device are shown in FIGS. 1 and 8 e.g. a touchable screen 1. Other examples of BCC enabled touch sensitive communication device, not shown, are e.g. a media streaming device, an audio streaming device, a media service device, a tablet, a computer, a video conference device, a virtual reality device, a head-mounted display, a visor, a touch-enabled surface such as a table, wall, door etc. The BCC enabled touch sensitive communication device 1, will be referred to below as a touchable BCC device 1.

Figure 2:
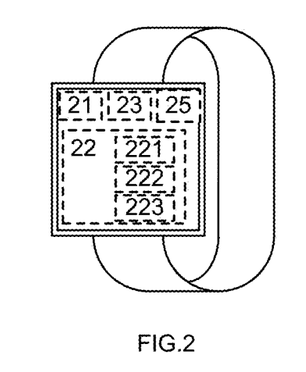
FIGS. 2-7 illustrate examples of wearable communication devices.
Figure 3:
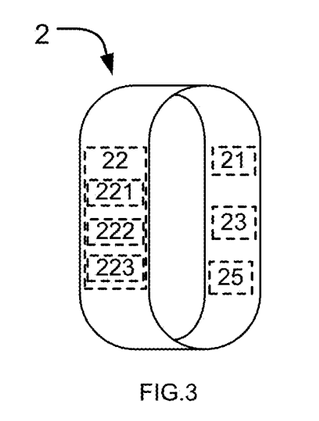
Figure 4:
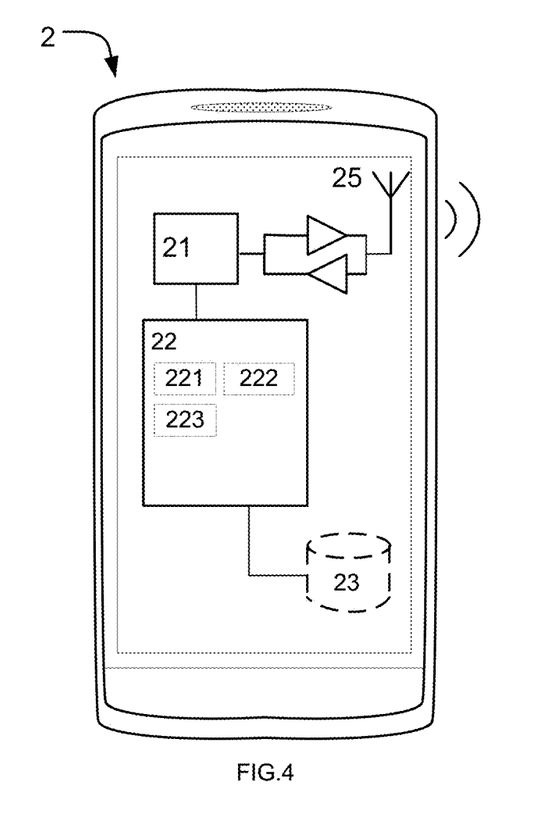
Figure 5:
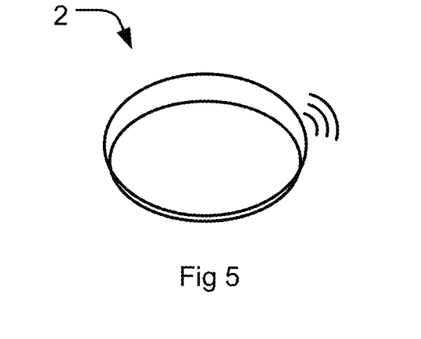
Figure 6:
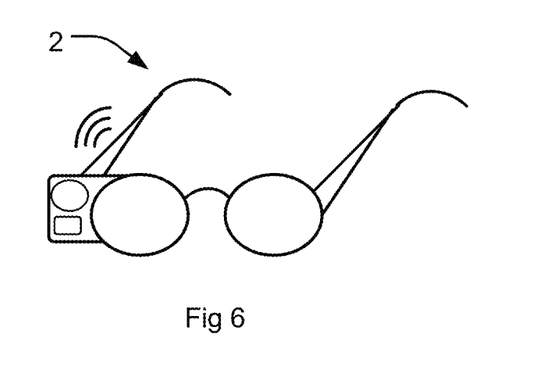
Figure 7:
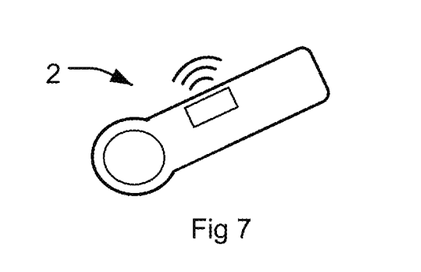

Referring to FIGS. 2 to 7, a BCC enabled wearable communication device in accordance with an embodiment of the present invention is illustrated generally at 2. A BCC enabled wearable communication device 2 in this application refers to a wireless communication device configured to be worn or touched by a person. Examples of such BAN enabled devices are shown in FIG. 2 as a watch, in FIG. 3 as a wristlet, in FIG. 4 as a smartphone, in FIG. 5 as a ring, in FIG. 6 as a pair of goggles or glasses and in FIG. 7 as an in-ear hearing device. The BCC enabled wearable communication device 2, will be referred to below as a wearable BCC device 2. The wearable BCC devices comprise communication circuitry 21 and processing circuitry 22 and a memory 23 for storing data. The memory may be any type of memory suitable for a wearable BCC device.

A system of a BCC enabled device and a wearable BCC enabled device is illustrated in FIG. 8. In the example in the figure a user 3 is equipped with at least one wearable BCC device, e.g. a smartphone, located on, or in the vicinity of, the body of the user. The user is touching a touchable BCC device, e.g. a touchable signboard with a map over a supermarket.

According to some aspects, a BCC connection, a BCC link 4, is established between the smartphone 2 and the touchable display 1, when the user 3 touches the display 1 and thus creating a Body Area Network, BAN. The display 1 transmits specific information data related to the touched location on the display screen to the smart phone 2 over the BCC link 4. According to one exemplary embodiment, the specific information data comprises any of links to websites, image-files, sound-files, map coordinates or other data related to the information shown on the touch sensitive interface on the touchable BCC device. In one aspect, the specific information data is automatically transmitted to the smartphone phone, when the BCC link is established. In one aspect, the user is asked if he/she would like to receive the specific information data to the smartphone, before transmitting the specific information data to the smartphone. In one aspect, the specific information data is stored on the smart phone.

In one embodiment, not shown the user is equipped with more than one wearable BCC device. In one example the user is equipped with a wristlet and a smartphone, where the wristlet is paired with the smartphone by another established BCC link. The specific information is transferred to the wristlet via the first BCC link 4 and then to smartphone via the second BCC link. The specific information data may also be stored in the wristlet and transferred to the smart phone or another communication device, such as a computer or a laptop at a later stage. In one aspect, the stored specific information data on the wristlet can be cleared as soon as the wristlet is removed from the user.

In one embodiment, the transmission of specific information data of a touchable BCC device 1, e.g. a touchable screen, may be performed according to a stored, predefined user configuration by touching the touchable BCC device 1, e.g. a display screen, by the owner or user 3 of the smartphone 2. A RF signal is detected, indicating the presence of the BCC enabled wearable device 2, the smartphone, thus confirming that BCC is available. Since the smartphone 2 is BCC enabled it will connect to the BCC enabled display screen 1 directly by using an established BCC link 4. The user 3 may be asked by the smartphone 2 through a user interface of the smartphone or by interacting with the smartphone 2 in some other way, such as pressing a button, touching a touchpad etc. to confirm that connection with the display screen 1 should be established.

In one embodiment, the specific information data related to the touched position on the touchable BCC device are automatically transmitted to the wearable BCC device 2 via the BCC link 4. The specific information data is automatically transmitted to the wearable BCC device 2 via any wireless communication link e.g. BT, WLAN, the BAN link, etc.

In one embodiment an application related to the specific information data is installed on the wearable BCC device 2. In one aspect, the application is automatically opened and the specific information data is processed and presented by the application. In one example, the specific information data is coordinates to a place presented on a map displayed on the touchable BCC device 1. The coordinates are transferred to a map application on the wearable BCC device, e.g. smart phone, and a map with the place marked is presented with guidance help to the place. In one example, the specific information data is a link to a website representing a store presented on the touchable BCC device. The website opens on a display on the wearable BCC device presenting more information of the selected store.

FIG. 1 show a communication device 1 configured for transferring specific information data comprising a touch sensitive interface 10 which now will be described in further detail. As previously stated, the communication device is Body Coupled Communication, BCC, enabled, and comprises communication circuitry 11 and processing circuitry 12. Furthermore, the communication device comprises a touch sensitive interface 10. Users may interact with the touch sensitive interface by touching their fingers or other instruments (e.g. a stylus etc.) on the touch sensitive interface. Touch sensitive interfaces may include air-touch and air-gesture capabilities in which the user interacts with the touch sensitive interfaces without physically touching the touch display.

The BCC enabled device 1 may be any wireless or wired communication device equipped with a touch sensitive interface 10, e.g. a touch screen, and a signboard with a touch screen 1 is shown only as an exemplary object. The BAN enabled capturing device is equipped with BAN electronic module 20. The electronic module may be designed as touchable area on the BCC enabled device 1 or may be designed as a tag or pod to be permanently attached to the BCC enabled device 1 or to be removable from the BCC enabled device 1. The BAN electronic module comprises a processing circuitry 12 configured to receive S1, via the communication circuitry 11, at least one BCC signal 4 via a body part, e.g. a finger, of a user 3 when the body part is touching the touch sensitive interface 10. Further the processing circuitry 12 is configured to detect S2 a position of the body part touching the touch sensitive interface based on the received at least one BCC signal. The processing circuitry is further configured to collect S3 specific information data related to the detected position on the touch sensitive interface and to transmit S4 via the communication circuitry, the specific information related to the detected position, to another BCC enabled device. According to an exemplary embodiment, the touch sensitive interface comprises a capacitive based touch display.

In one embodiment, the touch sensitive interface comprises at least one of a touch sensitive display, a touch screen, flat panel display, electronic display, video display, plasma display or a liquid crystal display. The touch sensitive interface may also be touch enabled walls, paintings, plastic film to be mounted on walls, doors e.g. refrigerator doors, all with some electronic circuitry to be used by the touch sensitive display.

The processor circuitry 12 is configured to execute the method according to the disclosure. The processor is typically a processing circuitry constituted by any suitable Central Processing Unit, CPU, microcontroller, Digital Signal Processor, DSP, etc. configured for executing computer code, such as a computer program implementing the proposed method. One example is that the computer code is an application, which may be downloaded from an external server. However, the method may as well be hardware implemented or a combination of hardware and software. The computer program may be stored in a memory, MEM, not shown. The memory can be any combination of a Random access Memory, RAM, and a Read only Memory, ROM. The memory may also comprise persistent storage, which for example, can be any single one or combination of magnetic memory, optical memory, or solid state memory or even remotely mounted memory.

The processor is configured to broadcast a signal, indicating ability to connect and/or transmit specific information data, when a detector 124 comprised in the processing circuitry detects the presence of another BCC enabled device 2.

The processing circuitry 12 is configured to receive S1, via the communication circuitry at least one BCC signal 4 to connect to another BCC enabled device. According to some aspects, the processing circuitry 12 comprises a receiver 123 for performing the receiving step S3. In one aspect the detector 123 is configured for detecting a RF signal which indicates the presence of another BAN enabled communication device.

The processing circuitry 12 is configured to detect S2 a position of the body part touching the touch sensitive interface based on the received at least one BCC signal. According to some aspect, the processing circuitry 12 comprises a detector 124 for detecting S2.

The processing circuitry 12 is configured to collect S3 specific information data related to the detected position on the touch sensitive interface. According to some aspects, the processing circuitry 12 comprises a collector 123 for collecting S3.

The processing circuitry 12 is configured to transmit S4 via the communication circuitry, the specific information related to the detected position, to the connected BCC enabled device 2. According to some aspects, the processing circuitry 12 comprises a transmitter 125 for transmitting S4.

In one embodiment the electronic module 20 unit comprises a capacitive touch system. The capacitive sensor system has low power consumption, which is less than 30 microamperes, when the BAN enabled communication device is touched. The sensitive range may be set to the range of 20-30 mm. The capacitive sensor system is always active. As soon as the user, who is touching or wearing a BCC enabled communication device, touches or is close to another BCC enabled device the detector 123 of the electronic module 20 starts to sense the presence of the other BCC enabled device.

The BCC electronic module 20 further comprises a radio communication interface 15 configured to communicate with another BAN enabled communication device by using BAN.

In one embodiment, the processing circuitry 12 is configured to provide communication between the touchable BCC device 1 and another BCC enabled device 2 e.g. a wristlet, via a BAN link 4 through a human body of the user 3 wearing the wristlet 2, when the user of the wristlet touches the touchable BCC device 1.

The touchable BCC device 1, as shown in FIG. 1, further comprises a wireless communication interface (i/f) 11 arranged for wireless communication with cellular communication systems and/or other wireless communication systems. The wireless communication interface may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The wearable BCC enabled device 2, as shown in FIG. 2-7, comprises a communication circuitry 21 arranged for communicating with other BCC enabled devices. The wearable device comprises a processing circuitry 22 configured to receive S5, via the communication circuitry 21, the collected specific information data from the touchable BCC enabled device 1, thereby enabling the processing circuitry of the wearable BCC enabled device 2 to process the specific information data.

In some aspects, the wearable BCC device 2 broadcasts a BCC signal. The processing circuitry 22 of the wearable BCC device is configured to broadcast the signal. According to some aspects, the processing circuitry comprises a broadcaster 221 for broadcasting. By broadcasting a BCC signal in the wearable BCC device 2, the touchable BCC device 1 is able to find the wearable BCC device if both devices are in contact, or in close proximity with, the body of the user.

In one embodiment, the specific information data is transmitted via a short range radio technology from the touchable BCC device 1 to the wearable BCC device when the user of the wearable device 2 is touching the touchable BCC device 1. In one aspect, the short range radio technology is any of Wi-Fi, Bluetooth or BCC technology.

In one embodiment, the specific information data comprises any of a link to a website, coordinates on a map, an image or a sound clip.

Figure 9:
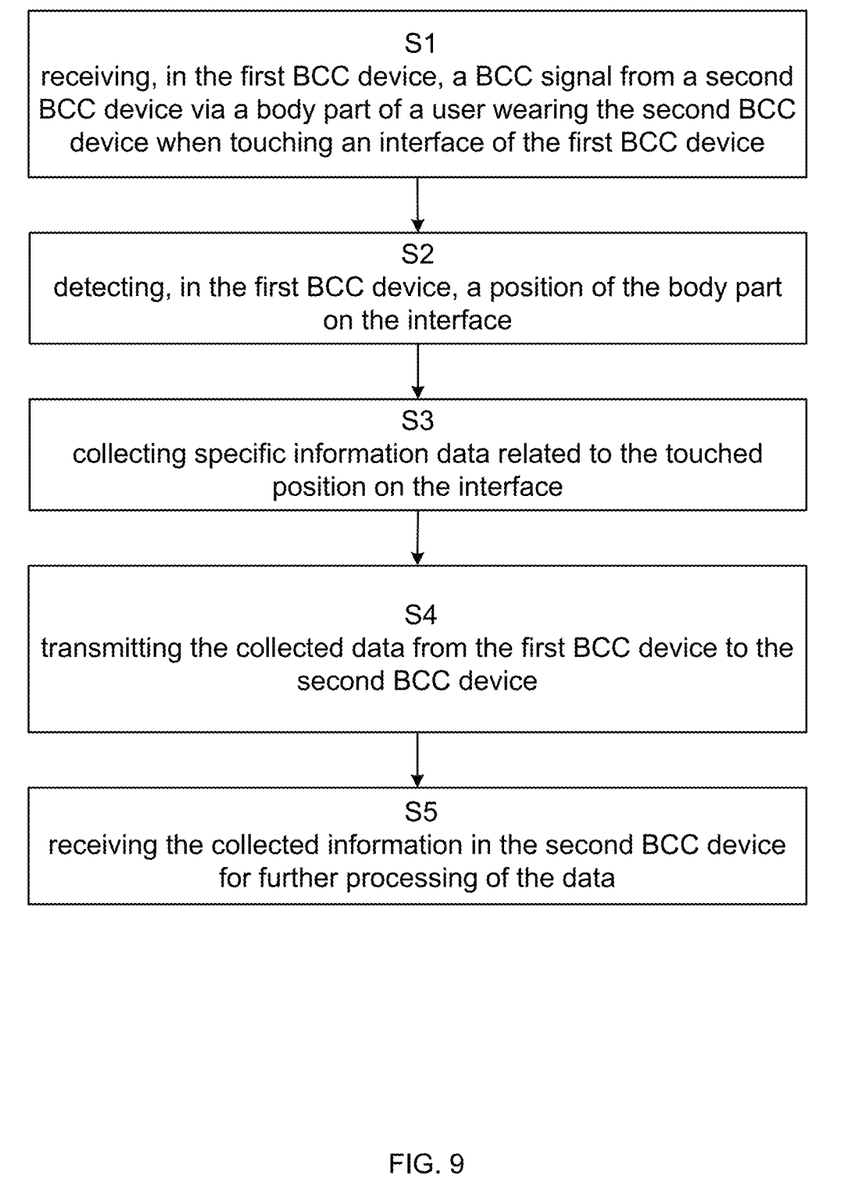
FIG. 9-10 show flow charts illustrating an exemplary method.
Figure 10:
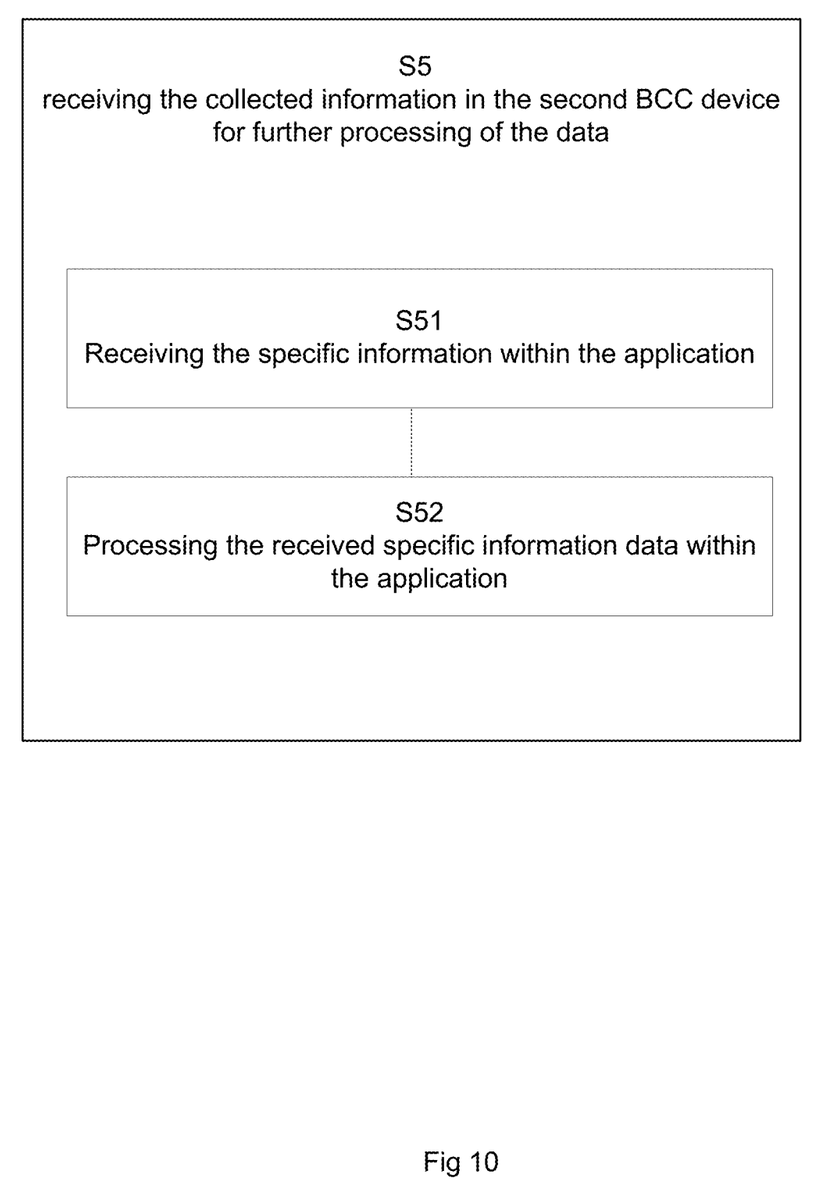

FIG. 9-10 are flow charts depicting example operations which may be taken by the system 100 of FIG. 8. All steps performed will be described hereafter in a logical order of the steps and not in the order of which device performs which steps.

The method will now be described starting from FIG. 9 disclosing method steps, performed in a system including at least a first 1 and a second 2 body coupled communication, BCC, enabled devices forming a body area network, BAN, wherein the first BCC enabled device 1 comprises a touch sensitive interface 10, e.g. a touch screen, and the second BCC enabled device is worn by a user e.g. smart phone, a wristlet, clip, ring, necklace etc. When the described steps are not dependent on each other, these steps may be implemented in any combination.

In the first step S1, at least one BCC signal 4 is received in the first BCC enabled device 1, from the second BCC enabled device 2 via a body part of the user 3 when the body part is touching the touch sensitive interface 10 of the first BCC enabled device. Thus the first and the second BCC enabled device are communicatively connected.

In the second step S2, a position of the body part on the touch sensitive interface 10 is detected, in first BCC enabled device, based on the received at least one BCC signal.

In the third step S3, specific information data related the detected position on the touch sensitive interface is collected.

In the fourth step S4, the collected information related to the detected position is transmitted from the first BCC enabled device to the second BCC enabled device.

In the fifth step S5, the collected information from the first BCC enabled device is received in the second BCC enabled device, thereby enabling the second BCC enabled device to process the specific information data. In one embodiment the second BCC device comprises an application which receives and process the specific information data.

In one further step, as shown in FIG. 10, wherein the second BCC device comprises an application, the specific information data is received S51 and processed S52 within the application.

In one embodiment, the specific information data comprises user related data.

In one example, the user of a BCC enabled mobile phone touches on a position on a touchable BCC enabled map, a touchable BCC enabled device 1, he or she would like to find the way to, e.g. Postiljonsgatan 9 in Lund, Sweden, the coordinates of the position on the map is transmitted to the mobile phone, a wearable BCC enabled device 2, of the user via BCC, and the Google Maps application or any application that listens to the transmitted coordinates starts.

The BCC enabled map, translates the x and y coordinate touched by the user into specific information data, which are transmitted as an intention, notification or event, which is then sent via BCC to the BCC enabled device of a person who touched the BCC enabled map.

Examples of specific information data is coordinates for a location on a map, a special offer from a store displayed on a sign board over a supermarket, the type of selected location, e.g. a store, museum, grocery etc.

In one example, the user of a BCC enabled mobile phone touches a BCC enabled information screen at a super market and gets all the offers directly onto the mobile phone.

In one example, the user of a BCC enabled mobile phone touches a picture on a BCC enabled computer screen e.g. touch enabled laptop and the selected picture is sent directly onto the mobile phone.

In one embodiment, BCC is used for first setting up the connection and creates a BAN, and then is Wi-Fi or Bluetooth used to transmit the specific information data.

It should be appreciated that the flow diagram of FIGS. 9-10 comprises some operations which are illustrated with a solid border and some operations which are illustrated with a dashed border. The operations which are comprised in a solid border are operations which are comprised in the broadest aspects of the disclosure. The operations which are comprised in a dashed line are aspects of the disclosure which may be comprised in, or a part of, or are further operations which may be taken in addition to the operations of the broader aspects of the disclosure. It should be appreciated that the operations need not be performed in order. Furthermore, it should be appreciated that not all of the operations need to be performed. Also, the functions or steps noted in the blocks can according to some aspects of the disclosure be executed continuously in a loop.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims, that the aspects of the disclosure may be implemented at least in part by means of both hardware and software, and that several "means" or "devices" may be represented by the same item of hardware.

The various example embodiments described herein are described in the general context of method steps or processes, which may be implemented according to some aspects by a non-transitory computer readable medium, which, when executed on a wireless communication device, causes the wireless communication device to perform one or several of the methods according to above. The computer program, embodied in a computer-readable medium, includes computer-executable instructions, such as program code, executed by computers in networked environments. A computer-readable medium may include removable and non-removable storage devices 13 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

Embodiments and aspects are disclosed in the following items:

Item 1. A method performed in a system 100 for transferring specific information data to a user (3) thereof comprising at least a first 1 and a second 2 body coupled communication, BCC, enabled devices forming a body area network, BAN, wherein the first BCC enabled device comprises a touch sensitive interface 10 and said second BCC enabled device is worn by said user wherein the method comprises the steps of:

- receiving S1, in the first BCC enabled device 1, at least one BCC signal 4 from said second BCC enabled device 2 via a body part of said user 3 when said body part is touching said touch sensitive interface 10 of said first BCC enabled device;
- detecting S2, in first BCC enabled device, a position of the body part on said touch sensitive interface based on the received at least one BCC signal;
- collecting S3 specific information data related the detected position on the touch sensitive interface;
- transmitting S4, the collected information related to the detected position from the first BCC enabled device to the second BCC enabled device; and
- receiving S5, the collected information from the first BCC enabled device in the second BCC enabled device, thereby enabling the second BCC enabled device to process the specific information data.

Item 2. The method according to item 1, wherein the second BCC device comprises an application and the receiving step S5 further comprises the steps of:

- receiving S51 the specific information data within the application; and
- processing S52 the received specific information data within the application.

Item 3. The method according to item 1 to 2, wherein said specific information data comprising any of a link to a website, coordinates on a map, an image or a sound clip.

Item 4. The method according to any of item 1 to 2, wherein the specific information data comprises user related data.

Item 5. A system 100 for transferring specific information data to a user 3 thereof comprising at least a first 1 and a second 2 body coupled communication, BCC, enabled devices for forming a body area network, BAN, wherein the first BCC enabled device 1 comprising:
a touch sensitive interface 10;
communication circuitry 11; and
processing circuitry 12 configured to:
receive S1, via the communication circuitry 11, at least one BCC signal 4 via a body part of said user 3 when said body part is touching said touch sensitive interface 10;
detect S2 a position of the body part touching said touch sensitive interface based on the received at least one BCC signal;
collect S3 specific information data related to the detected position on the touch sensitive interface; and
transmit S4 via the communication circuitry, the specific information related to the detected position, to the second BCC device 2;
and wherein the second BCC enabled device 2 comprises:
communication circuitry 21;
processing circuitry 22 configured to:
receive S5, via the communication circuitry 21, the collected specific information data from the first BCC enabled device 1, thereby enabling the second BCC enabled device 2 to process the specific information data.

Item 6. The system according to item 5, wherein the specific information data is transmitted via a short range radio technology.

Item 7. The system according to item 6, wherein the short range radio technology is any of Wi-Fi, Bluetooth or BCC technology.

Item 8. The system according to any of item 5 to 7, wherein said specific information data comprising any of a link to a website, coordinates on a map, an image or a sound clip.

Item 9. The system according to any of item 5 to 7, wherein the specific information data comprises user related data.

Item 10. The system according to any of item 5 to 9, wherein the second BCC enabled device 2 comprises an application configured to receive the transmitted specific information data and process the received specific information data.

Item 11. The system according to item 5 to 10, wherein the touch sensitive interface 10 comprises at least one of a touch sensitive display, a touch screen, flat panel display, electronic display, video display, plasma display or a liquid crystal display.

Item 12. A method performed in a first Body Coupled Communication, BCC, enabled device 1 for transferring specific information data to a second BCC enabled device 2, which is worn by a user 3, wherein the first BCC enabled device 1 comprising a touch sensitive interface, the method comprising:
receiving S1 at least one BCC signal via a body part of said user 3 when said body part is touching said touch sensitive interface 10;
detecting S2 a position of the body part touching said touch sensitive interface based on the received at least one BCC signal;
collecting S3 specific information data related the detected position on the touch sensitive interface; and
transmitting S5, the collected information related to the detected position to the second BCC enabled device 2.

Item 13. A Body Coupled Communication, BCC, enabled communication device 1 configured for transferring specific information data comprising:
a touch sensitive interface;
communication circuitry 11; and
processing circuitry 12 configured to:
receive S1, via the communication circuitry 11, at least one BCC signal via a body part of a user of a second BCC enabled device when said body part is touching said touch sensitive interface 10;
detect S2 a position of the body part touching said touch sensitive interface based on the received at least one BCC signal;
collect S3 specific information data related to the detected position on the touch sensitive interface 10; and
transmit S4, via the communication circuitry 11, the specific information related to the detected position, to said second BCC device.

The invention claimed is:

1. A method performed in a system comprising first and second body coupled communication (BCC) enabled devices forming a body area network (BAN) for providing information to an associated user of the system, wherein the first BCC enabled device comprises a touch sensitive interface and said second BCC enabled device is worn by said associated user wherein the method comprises:
receiving, in the first BCC enabled device, at least one BCC signal from said second BCC enabled device via a body part of said associated user when said body part touches said touch sensitive interface of said first BCC enabled device, the receiving of the at least one BCC signal indicating to the first BCC enabled device that the second BCC enabled device is BCC enabled;
detecting, in first BCC enabled device, a position of the body part relative to said touch sensitive interface;
collecting specific information data related to a graphical item presented by the first BCC enabled device on the touch sensitive interface and located at the detected position on the touch sensitive interface;
transmitting the collected specific information data related to the graphical item located at the detected position from the first BCC enabled device to the second BCC enabled device; and
receiving the collected specific information data from the first BCC enabled device in the second BCC enabled device, the second BCC enabled device processing the received specific information data and providing the associated user with corresponding information relating to the graphical item.

2. The method according to claim 1, wherein the second BCC device comprises an application that, when executed, carries out the receiving, the processing and the providing.

3. The method according to claim 1, wherein said specific information data comprises at least one of a link to a website, coordinates on a map, an image or a sound clip.

4. The method according to claim 1, wherein the specific information data comprises user related data.

5. A system for providing specific information to an associated user of the system, the system comprising first and second body coupled communication (BCC) enabled devices that form a body area network (BAN), wherein the first BCC enabled device comprises:
  a touch sensitive interface;
  first communication circuitry; and
  first processing circuitry configured to:
    receive, via the first communication circuitry, at least one BCC signal from said second BCC enabled device via a body part of said associated user when said body part touches said touch sensitive interface, the at least one BCC signal indicating to the first BCC enabled device that the second BCC enabled device is BCC enabled;
    detect a position of the body part relative to said touch sensitive interface;
    collect specific information data related to a graphical item presented by the first BCC enabled device on the touch sensitive interface and located at the detected position on the touch sensitive interface; and
    transmit via the first communication circuitry, the specific information data related to the graphical item located at the detected position, to the second BCC device;
  and wherein the second BCC enabled device comprises:
    second communication circuitry; and
    second processing circuitry configured to:
      receive, via the second communication circuitry, the collected specific information data from the first BCC enabled device, process the received specific information data and provide the associated user with corresponding information relating to the graphical item.

6. The system according to claim 5, wherein the specific information data is transmitted via a short range radio technology.

7. The system according to claim 6, wherein the short range radio technology is one of Wi-Fi, Bluetooth or BCC technology.

8. The system according to claim 5, wherein said specific information data comprises at least one of a link to a website, coordinates on a map, an image or a sound clip.

9. The system according to claim 5, wherein the specific information data comprises user related data.

10. The system according to claim 5, wherein the touch sensitive interface comprises at least one of a touch sensitive display, a touch screen, flat panel display, electronic display, video display, plasma display or a liquid crystal display.

11. A method performed in a first Body Coupled Communication (BCC) enabled device for transferring specific information data to a second BCC enabled device, is the second BCC enabled device being worn by an associated user, wherein the first BCC enabled device comprises a touch sensitive interface, the method comprising:
  receiving at least one BCC signal from said second BCC enabled device via a body part of said associated user when said body part touches said touch sensitive interface, the receiving of the at least one BCC signal indicating to the first BCC enabled device that the second BCC enabled device is BCC enabled;
  detecting a position of the body part relative to said touch sensitive interface;
  collecting specific information data related to a graphical item presented by the first BCC enabled device on the touch sensitive interface and located at the detected position on the touch sensitive interface; and
  transmitting the collected specific information data related to the graphical item located at the detected position to the second BCC enabled device.

12. A Body Coupled Communication (BCC) enabled device configured for transferring specific information data to an associated second BCC enabled device, the BCC enabled device comprising:
  a touch sensitive interface;
  communication circuitry; and
  processing circuitry configured to:
    receive, via the communication circuitry, at least one BCC signal from said associated second BCC enabled device via a body part of an associated user of said associated second BCC enabled device when said body part touches said touch sensitive interface, the at least one BCC signal indicating to the BCC enabled communication device that the associated second BCC enabled device is BCC enabled;
    detect a position of the body part relative to said touch sensitive interface;
    collect specific information data related to a graphical item presented by the BCC enabled device on the touch sensitive interface and located at the detected position on the touch sensitive interface; and
    transmit, via the communication circuitry, the collected specific information data related to the graphical item located at the detected position to said associated second BCC enabled device.

* * * * *